United States Patent
Yoshino et al.

(10) Patent No.: US 7,990,011 B2
(45) Date of Patent: Aug. 2, 2011

(54) ROTOR FOR ELECTRIC MOTOR

(75) Inventors: Tsutomu Yoshino, Wako (JP); Koichi Oku, Wako (JP); Hisashi Murakami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 232 days.

(21) Appl. No.: 12/087,810

(22) PCT Filed: Feb. 8, 2007

(86) PCT No.: PCT/JP2007/052660
§ 371 (c)(1),
(2), (4) Date: Dec. 4, 2008

(87) PCT Pub. No.: WO2007/091727
PCT Pub. Date: Aug. 16, 2007

(65) Prior Publication Data
US 2010/0052452 A1    Mar. 4, 2010

(30) Foreign Application Priority Data
Feb. 8, 2006 (JP) ................ 2006-031237

(51) Int. Cl.
*H02K 1/27* (2006.01)
*H02K 1/28* (2006.01)
(52) U.S. Cl. ............. 310/156.43; 310/156.32; 310/268
(58) Field of Classification Search ............. 310/156.32–156.37, 156.43, 268
See application file for complete search history.

(56) References Cited

U.S. PATENT DOCUMENTS

| | | | | |
|---|---|---|---|---|
| 4,629,920 A * | 12/1986 | Hermann | ............... | 310/156.35 |
| 5,280,209 A * | 1/1994 | Leupold et al. | ........... | 310/156.41 |
| 6,509,666 B1 | 1/2003 | Huang et al. | | |
| 6,841,910 B2 * | 1/2005 | Gery | .............................. | 310/103 |
| 7,453,180 B2 * | 11/2008 | van den Bergh et al. | ........................ | 310/156.37 |
| 2002/0180295 A1* | 12/2002 | Kaneda et al. | ........... | 310/156.43 |
| 2005/0040721 A1 | 2/2005 | Kusase et al. | | |
| 2005/0179337 A1 | 8/2005 | Hasebe et al. | | |
| 2008/0042515 A1* | 2/2008 | Butterfield | ................... | 310/268 |

FOREIGN PATENT DOCUMENTS

| | | |
|---|---|---|
| JP | 2003-209963 | 7/2003 |
| JP | 2004-350427 | 12/2004 |
| JP | 2005-5984 * | 2/2005 |

\* cited by examiner

*Primary Examiner* — Burton Mullins
(74) *Attorney, Agent, or Firm* — Carrier Blackman & Associates, P.C.; Joseph P. Carrier; William D. Blackman

(57) ABSTRACT

A rotor for an electric motor (10) includes a magnetic assembly (12) formed into a ring-shaped plate form, a rotor disc (11) for holding an inner periphery of the magnet assembly, and an outer peripheral ring (13) for holding an outer periphery of the magnet assembly. The magnet assembly is composed of first and second main magnets (12A-1, 12A-2) having magnetizations directions that are oriented perpendicularly and having orientations that are opposite one another, and first and second submagnets (12B-1, 12B-2) having magnetization directions that are oriented perpendicularly in a circumferential direction and having orientations that are opposite one another. At least one group of magnets selected from the main magnets and the submagnets has a wedge-shaped planar part. The planar parts of the first and second main magnets and first and second submagnets form the same plane of rotation. The magnets are arranged so that the magnetization directions of adjacent magnets are perpendicular to one another.

19 Claims, 6 Drawing Sheets

ROTOR FOR ELECTRIC MOTOR

TECHNICAL FIELD

The present invention relates to a rotor for an electric motor, and in particular relates to an axial disc-type rotor for an electric motor having a Halbach array magnet.

BACKGROUND ART

A variety of types of electric motors are known that make use of a Halbach array magnet. For example, the use of a magnet in an application involving a linear motor is disclosed in JP-A-2003-209963, and the use of a magnet in an application involving a rotor is disclosed in JP-A-2004-350427. In the linear motor of JP-A-2003-209963, a Halbach array structure (Halbach magnet array) is employed as a field pole magnet array. In the rotor of JP-A-2004-350427, the use of the Halbach array structure results in a reduction in thermal demagnetization, an increase in the effective magnetic flux, and other improvements.

The Halbach array structure is composed of a main magnet whose polar orientation (N pole, S pole; referred to below as the "magnetization direction") is a first direction, and a sub-magnet whose magnetization direction is a second direction substantially perpendicular to the first direction. The main magnet is composed of a first main magnet and a second main magnet. The submagnet is composed of a first submagnet and a second submagnet. The magnets are permanent magnets. In the Halbach array structure, the first main magnet, first submagnet, second main magnet, and second submagnet are repeated as a basic arrangement in the stated order until a required length or shape has been achieved. An overall configuration of a magnet assembly of a motor rotor is thereby formed. In the above magnet assembly arrangement state, the magnetization directions of the first main magnet and second main magnet, which are arranged in an alternating fashion, are oriented in the first direction and face opposite directions. Similarly, the magnetization directions of the first submagnet and second submagnet, which are arranged in an alternating fashion, are oriented in the second direction and face opposite directions.

In a rotor for an electric motor having a magnet assembly based on the above-described Halbach array structure, magnetic flux density is increased by the array structure of the magnets, the magnetic flux is efficiently utilized, and a small-sized high-performance rotor can be realized without the need for a yoke for forming a magnetic path.

Over the past several years, the performance of magnets has improved, and magnets having extremely strong magnetic forces have become prevalent. However, if a Halbach array is used in which a plurality of magnets having different magnetization directions is densely arranged, a strong cover or large guide must be placed around the magnets in order to prevent the magnets from moving out of alignment due to repelling forces between adjacent magnets. In addition, a structure is utilized in MRI and the like in which the magnets are slightly separated and held by a guide because importance is placed on securely fixing the magnets. On the other hand, wind-power generation motors, elevator-driving motors, in-wheel motors (directly installed in a wheel of a vehicle), and other electric motors must be assembled to fit into a narrow space. However, a large guide or cover presents an obstacle to fulfilling this requirement. When the magnets are arranged so as to be separated from one another, the magnetic flux density will decrease, and the performance of the motor will therefore decrease. More specifically, when the magnets are arranged in a separated fashion, magnetic resistance in the magnetic circuit formed by the magnets will increase, the effective magnetic flux that is interlinked with a coil and that contributes to the motor output will decrease, and the performance of the motor will therefore decrease.

DISCLOSURE OF THE INVENTION

It is therefore an object of the present invention to provide an electric motor rotor for generating high magnetic flux that is thin and light in weight and in which a magnet assembly formed in a dense gap-free Halbach array is fashioned into an annular shape.

According to an aspect of the present invention, there is provided a rotor for an electric motor, which comprises: a magnet assembly formed into a ring-shaped plate form; an inner periphery holder for holding an inner periphery of the magnet assembly; and a ring-shaped outer periphery holder for holding an outer periphery of the magnet assembly, wherein the magnet assembly is comprised of first and second main magnets having magnetization directions that face a first direction and having orientations that are opposite one another, and first and second submagnets having magnetization directions that face a second direction perpendicular to the first direction and having orientations that are opposite one another, at least one group of magnets selected from the main magnets and the submagnets has a wedge-shaped planar part; and the planar parts of the first and second main magnets and first and second submagnets form the same plane of rotation, and are arrayed such that the magnetization directions of adjacent magnets are perpendicular to one another.

In the rotor, the magnet assembly is formed into the shape of a ring-shaped plate and at least one group of magnets selected from the main magnets and the submagnets constituting the ring-shaped magnet assembly has wedge-shaped planar parts. Accordingly, the main magnets and submagnets that constitute the ring-shaped plate-form magnet assembly can be arranged without any gap therebetween. In addition, a high magnetic flux density can be achieved by utilizing a Halbach array structure as the magnet array of the ring-shaped plate-form magnet assembly.

This configuration makes it possible to realize a disc-shaped rotor for an electric motor whose overall shape is relatively flat. In particular, the magnet assembly constituting a magnet part is formed into a ring-shaped plate form using a Halbach array structure, and at least one group of magnets selected from the first and second main magnets as well as the first and second submagnets that constitute the Halbach array structure has a wedge-shaped planar part. Therefore, the ring-shaped plate-form magnet assembly can be arranged without gaps, and a high magnetic flux density can be achieved.

The inner peripheral parts and outer peripheral parts of the first and second main magnets and the first and second submagnets constituting the magnet assembly are held and fixed on the basis of the relationship between the shapes of the inner periphery holder and outer periphery holder and the shape of the magnets. Therefore, the rotor for an electric motor can be made smaller and lighter without the need for bolts or other extraneous fastening tools and holding devices.

The first and second main magnets and first and second submagnets that constitute the magnet assembly are formed into a shape having a wedge-shaped planar part, and the four magnets are given the same shape. As a result, upon assemblage of the rotor, the magnets can be fixed in position one by one using only a single type jig against the magnetic force of an adjacent one of the magnets already fixed in position. Since only a single type jig is required, the cost of rotor production can be reduced.

Preferably, the first direction is the direction along the axis of rotation of the rotor, while the second direction is substantially the direction of rotation of the rotor.

Desirably, the inner periphery holder is a rotor disc having a receiving part for accommodating the magnet assembly, and a central part for securely fixing an inner peripheral edge part of the magnet assembly.

In a preferred form, an inclined surface part is formed on the inner peripheral edge parts of each of the main magnets and submagnets constituting the magnet assembly, and a magnet clamp for holding down the inclined surface part is preferably formed on a circumferential part of the central part of the rotor disc.

Preferably, the inclined surface part is formed on outer peripheral edge parts of each of the main magnets and submagnets constituting the magnet assembly, and a magnet clamp for holding down the inclined surface part is preferably formed on an inner peripheral part of the ring-shaped outer periphery holder.

Desirably, the motor rotor has a magnet cover. In the magnet assembly, the main magnets and submagnets are integrated in a closely-adhered state by the rotor disc, ring-shaped outer periphery holder, and magnet cover.

An adhesive is preferably used to bind together the magnets of the magnet assembly, and to bind together the magnet assembly, rotor disc, and magnet cover.

Preferably, the ring-shaped outer periphery holder, rotor disc, and magnet assembly are integrated with one another in a boltless state by interlocking irregularities.

The magnet cover may be formed using a non-magnetic light metal or a high-strength resin composite.

Preferably, the magnet assembly is accommodated near an outer side of the rotor disc.

In a preferred form, the rotor disc, ring-shaped outer periphery holder, and magnet cover are formed from a non-magnetic light metal or a high-strength resin composite.

BEST MODE FOR CARRYING OUT THE INVENTION

Figure 1:
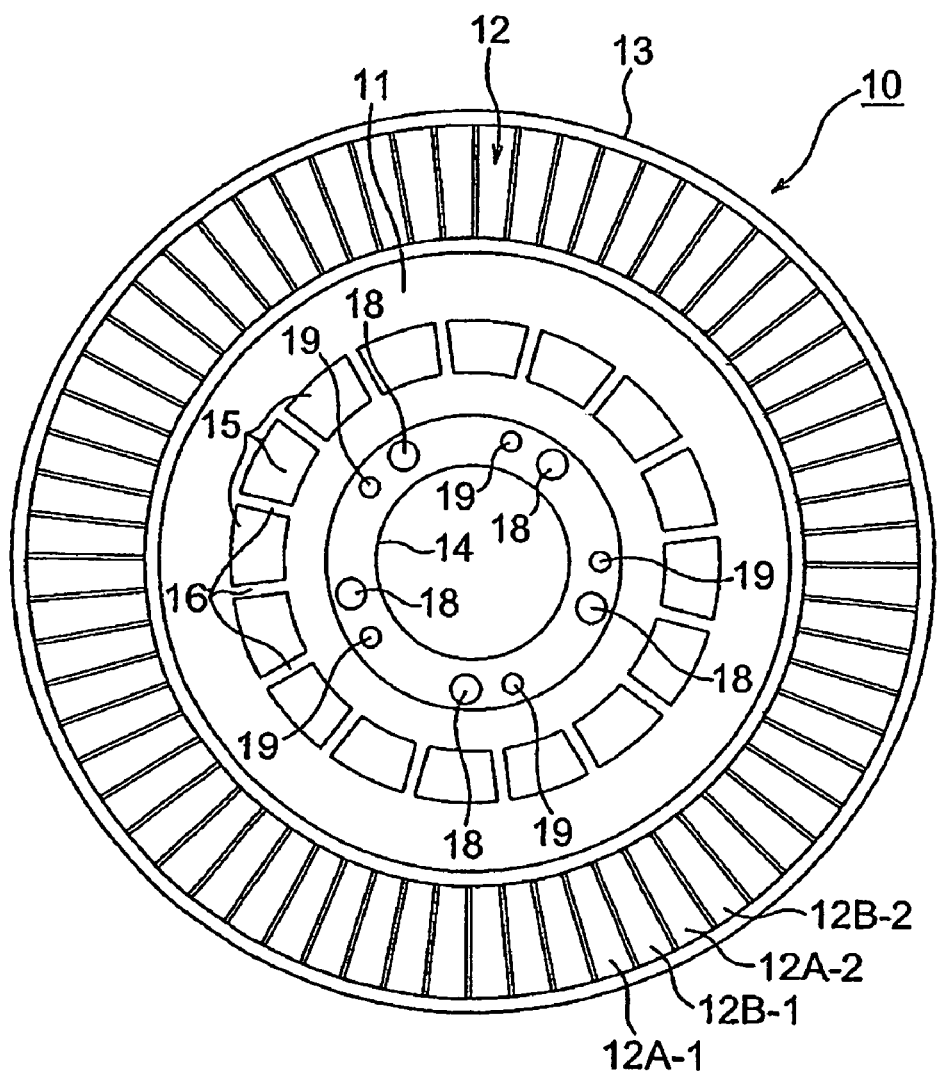
FIG. 1 is a front elevational view of a rotor for an electric motor, according to a first embodiment of the present invention.
Figure 2:
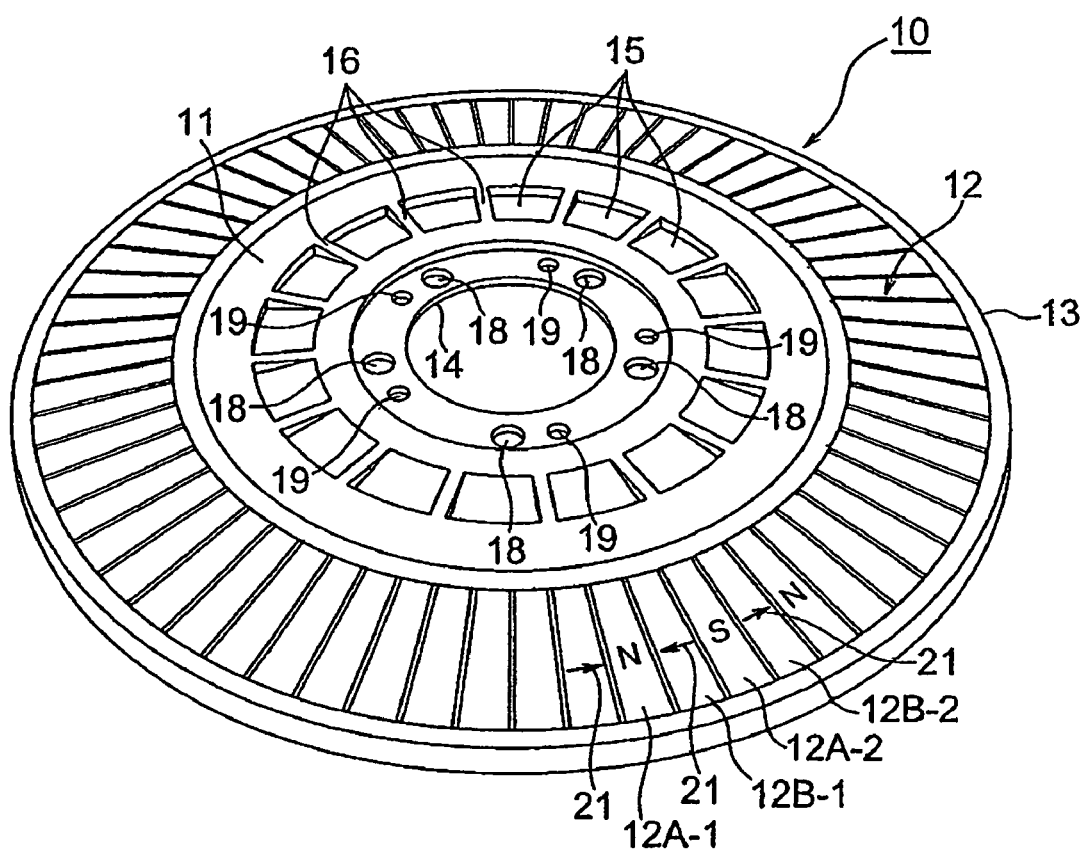
FIG. 2 is a perspective view of the rotor according to the first embodiment.
Figure 3:
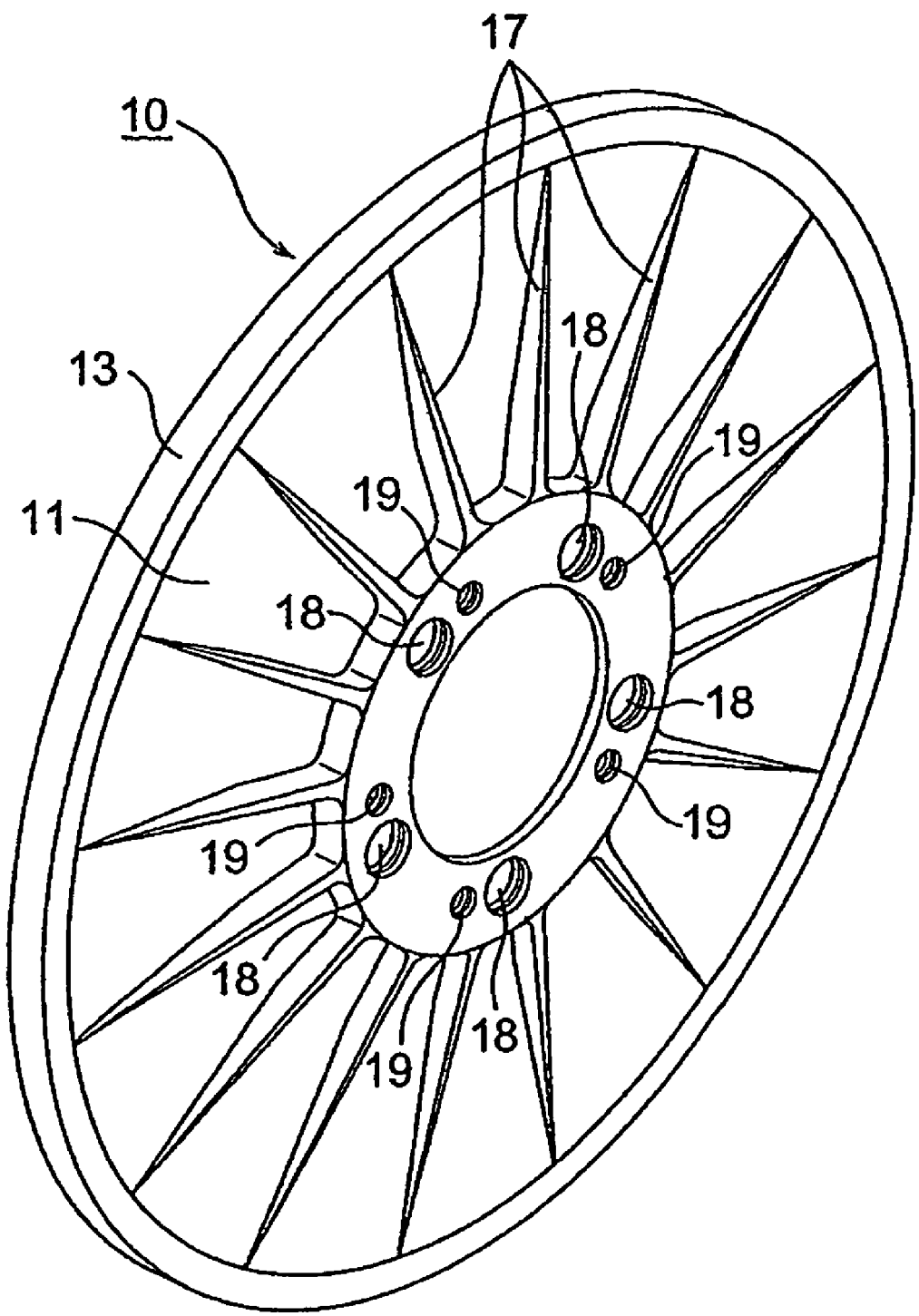
FIG. 3 is a rear view of the rotor according to the first embodiment.
Figure 4:
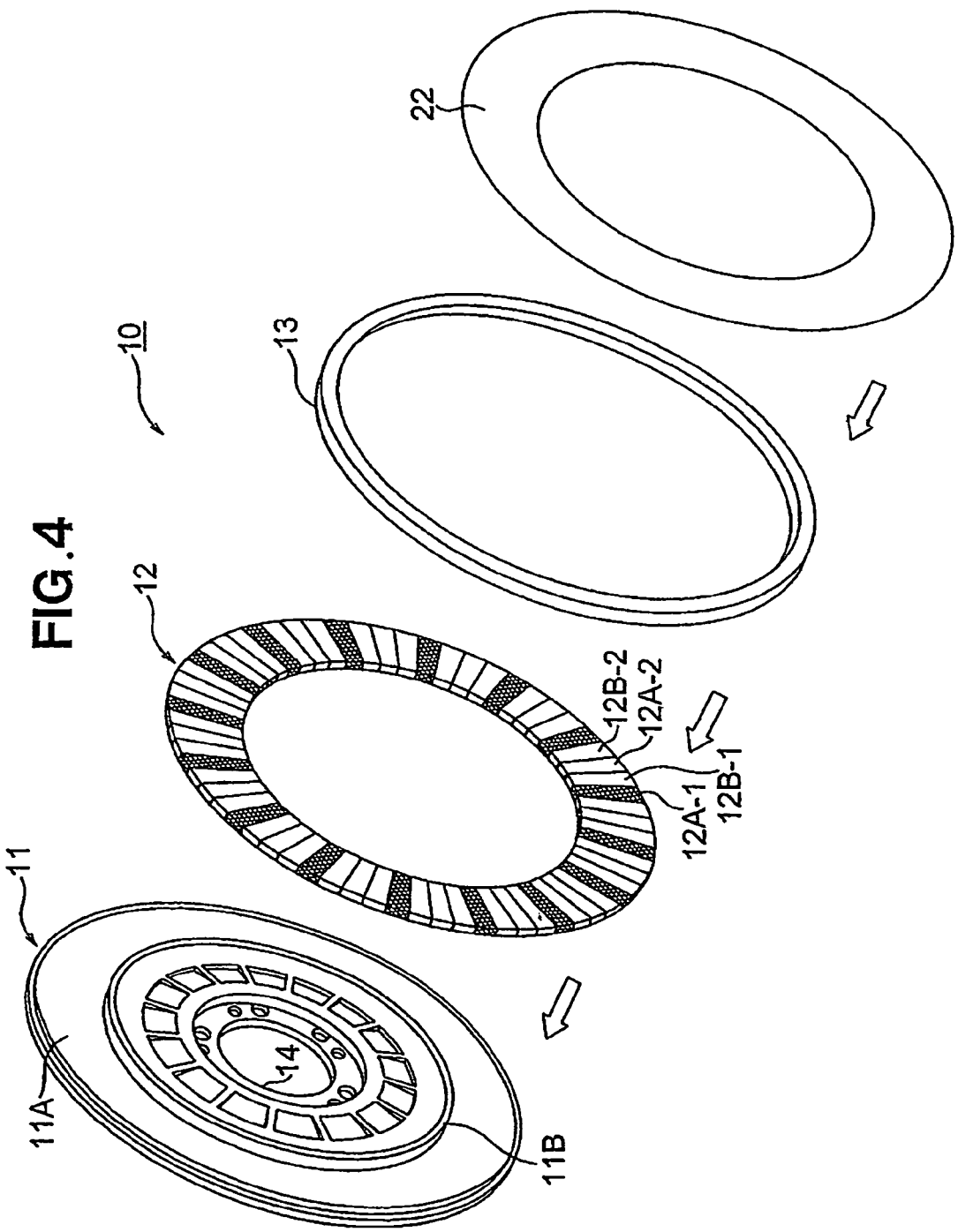
FIG. 4 is an exploded view of the rotor according to the first embodiment.

A structure for a rotor for an electric motor according to a first embodiment of the present invention shall be described with reference to FIGS. 1 through 4. FIG. 1 is a front view of a rotor whose magnet cover has been removed, FIG. 2 is a perspective view of the same rotor, FIG. 3 is a rear view of the rotor, and FIG. 4 is an exploded view of the rotor.

The outward appearance of the entirety of a rotor 10 is a comparatively flat disc shape. In the rotor 10, the numerical symbol 11 indicates a rotor disc, 12 indicates a magnet assembly, and 13 indicates an outer peripheral ring. The magnet assembly 12 constituting a magnet part of the rotor 10 is formed into a ring-shaped plate form by arranging a plurality of magnet pieces. The magnet pieces constituting the magnet assembly 12 each have the same wedge-shaped planar form having a predetermined tapered angle. A gapless and dense planar ring shape can therefore be realized. This shape contributes to a decrease in weight and increase in output in the rotor 10. Therefore, "gapless and dense" refers to a state in which adjacent magnets are closely attached without a need for a cover or guide, such as those used in the above-described examples from prior art. However, as described above, in the present embodiment, a thin layer of an epoxy-based adhesive is applied between the magnets, and the shape of the magnet assembly 12 is maintained. The rotor disc 11 covers and accommodates one surface of the ring-shaped plate-form magnet assembly 12 and functions as a member for holding/fixing an inner periphery of the ring-shaped plate-form magnet assembly 12. A portion 11A of the rotor disc 11 is a receiving part for accommodating the magnet assembly 12, and a central part 11B of the rotor disc 11 is a portion for holding/fixing the inner periphery of the magnet assembly 12, as shown in FIG. 4. The outer peripheral ring 13 functions as a member for holding an outer periphery of the ring-shaped plate-form magnet assembly 12.

The rotor disc 11 and outer peripheral ring 13 are both made from a high-strength non-magnetic metal (material: A2017 or A7075). The rotor disc 11 and outer peripheral ring 13 may also be composed of a high-strength resin composite such as CFRP or GFRP. The rotor 10 can be made lighter by using these non-magnetic light metals and high-strength resin composites. In the present embodiment, a Halbach array is used, whereby a sufficient amount of magnetic flux can be maintained even when an iron-based magnetic material is not used. Therefore, aluminum or another non-magnetic light metal or a high-strength resin composite can be used as long as the material allows the strength of the rotor disc 11 to be maintained. In the present invention, the Halbach array is used, whereby the leakage of magnetic flux to the back surface of the magnets is reduced; iron-based magnetic yokes, which are generally used in order to prevent the magnetic flux from leaking to the back surface of the magnets, are rendered unnecessary; and the rotor 10 can further be made lighter and thinner. In applications where the weight of the rotor 10 is not an object, the amount of effective magnetic flux may be increased by using a well-known iron-based magnetic metal. For example, when a reduction in the weight of the rotor 10 is important, the rotor disc 11, outer peripheral ring 13, and magnet cover 22 are preferably formed from a non-magnetic light metal or a high-strength resin composite. When low cost, high rigidity, and other factors are more important than size and weight, as in an electric motor for wind-power generation, the rotor disc 11 and outer peripheral ring 13 may be formed from an iron-based magnetic metal in order to reduce magnet usage.

In the ring-shaped plate-form magnet assembly 12, sixty-four similarly shaped permanent magnet pieces (referred to below as "magnets") are arranged in a circumferential direction to thereby form the magnet assembly into a planar ring-shaped plate form. The sixty-four magnets are arranged in a Halbach array structure. In this Halbach array structure, a first main magnet (N pole) 12A-1, a first submagnet 12B-1, a second main magnet (S pole) 12A-2, and a second submagnet 12B-2 are repeated as a basic array configuration around the entire periphery. The magnetization directions of the main magnets (12A-1, 12A-2) are oriented in front-and-rear directions of the main magnets (namely, the direction along the axis of rotation of the rotor). For example, as shown in FIG. 2, a side of the first main magnet 12A-1, located on the front side of the Figure sheet is an N pole while a side of the first main magnet, located on the rear side of the Figure sheet is an S pole. Conversely, a side of the second main magnet 12A-2 which is located on the front side of the Figure sheet is an S pole while a side of the second main magnet which is located on the rear side of the Figure sheet is an N pole. The magnetization directions of the submagnets (12B-1, 12B-2) are linear along the circumferential direction (namely, the direction of rotation of the rotor). For example, in the counter-clockwise direction, a left side of the first submagnet 12B-1 in the circumferential direction is an N pole and the right side is an S pole, as shown in FIG. 2. Conversely, in the counter-clockwise direction, a left side of the second submagnet 12B-2 in the circumferential direction is an S pole and the right side is an N pole. In FIG. 2, as an example, the symbols "N" and "S" marking some of the main magnets indicate the magnetization directions of the main magnets on the side facing the front of the sheet. In addition, in FIG. 2, as an example, the arrows 21 marking some of the submagnets indicate the magnetization directions (S→N) of the submagnets. The magnetization directions of the main magnets and submagnets are substantially perpendicular.

As described above, the magnets of the ring-shaped plate-form magnet assembly 12 are arranged so that the magnetization directions of the first main magnet 12A-1 and second main magnet 12A-2, which are arranged in an alternating fashion, are oriented perpendicularly in the first direction (the direction of the axis of rotation of the rotor), and face opposite directions. Similarly, the magnetization directions of the first submagnet 12B-1 and second submagnet 12B-2, which are arranged in an alternating fashion, are linear along the second circumferential direction (the direction of rotation of the rotor; i.e., a substantially circumferential direction), and face opposite directions.

A hole 14 is formed on the central part of the rotor disc 11. A shaft member (not shown) is inserted through the hole 14. A required concavity 15 and a plurality of rib parts 16 are formed on a front surface of the rotor disc 11, as shown in FIGS. 1 and 2, and a plurality of rib parts 17 is formed in a radial pattern in a radial direction on a back surface of the rotor disc 11, as shown in FIG. 3. Accordingly, the rotor disc 11 can be made lighter and is endowed with the necessary rigidity and strength. Five large-diameter small holes 18 and five small-diameter small holes 19 are formed at equal intervals around the periphery of the hole 14. One small hole 18 and one small hole 19 form a pair, and are arranged in a fixed positional relationship. A thread of a bearing unit (not shown) is passed through the small hole 18, and a bolt for fixing the bearing unit and rotor disc 11 is passed through the small hole 19. The bearing unit is provided so that the rotor 10 will rotate smoothly about the shaft member.

The rotor for an electric motor 10 is composed of the above-described rotor disc 11, ring-shaped plate-form magnet assembly 12, outer peripheral ring 13, and magnet cover 22, as shown in FIG. 4. First, the rotor disc 11 is prepared. Next, the rotor disc 11 is loaded into an assembly apparatus (not shown) for manufacturing rotors, and the assembly apparatus is used to affix the magnets (12A-1, 12A-2, 12B-1, 12B-2) to the rotor disc 11 one at a time in a predetermined order using an epoxy-based adhesive. The adhesive is not limited to an epoxy-based adhesive, and other adhesives (e.g., urethane-based adhesives) may also be used. While the magnets are being affixed to the rotor disc 11, the magnets are pressed down by the assembly apparatus so that magnetic forces between the magnets do not cause the magnets to scatter. In a final step, the adhesive is cured, and the ring-shaped plate-form magnet assembly 12 is formed in a state in which the magnets have been fixed to the rotor disc 11. The outer peripheral ring 13 is mounted to an outer peripheral edge part of the magnet assembly in order to fix the magnet assembly 12 to the rotor disc 11. Epoxy-based adhesive is then applied to an exposed part of the magnet assembly 12 and other parts that are in contact with the magnet cover 22, and the magnet cover 22 is mounted to the front surface of the rotor 10. Accordingly, the rotor 10 is integrated in a compact form having a substantially sealed interior. The magnet cover 22, like the rotor disc 11 and outer peripheral ring 13, is formed from a light-weight non-magnetic metal, but may also be formed from a light-weight high-strength resin composite such as CFRP. In addition, the rotor disc 11, outer peripheral ring 13, and magnet cover 22 may each be formed from a different material (e.g., A2017, A7075, and CFRP).

Aluminum has a greater linear coefficient of expansion than that of the magnets. Consequently, the rotor 10 may thermally deform under operating temperatures. Therefore, e.g., Ti-6Al-4V or another titanium-based material may be used for the non-magnetic light metal instead of aluminum in operation temperatures that will cause the rotor 10 to thermally deform. Ti-6Al-4V has a linear coefficient of expansion nearer to a sintered Nd—Fe—B magnet than aluminum and is both non-magnetic and light in weight. Therefore, Ti-6Al-4V is particularly suitable when the temperature at which the rotor 10 is to be used varies greatly. The linear coefficient of expansion of a high-strength resin composite such as CFRP can be adjusted by changing the direction of the fiber. Therefore, a high-strength resin composite may be formed in which the direction of the fiber has been appropriately adjusted with consideration to the temperature at which the rotor 10 of the present embodiment will be used so that the difference between the linear coefficient of expansion thereof and the linear coefficient of expansion of the magnets used in the rotor 10 will become less pronounced.

The rotor 10 faces a stator (not shown). A three-phase alternating current is fed to a coil in the stator, whereby the rotor 10 rotates. A configuration can be employed in which two rotors 10 are placed on either side of the stator.

The magnet assembly 12 is sealed in a gapless manner by the rotor disc 11, outer peripheral ring 13, and magnet cover 22; the magnets are affixed together by the adhesive; and the magnet assembly 12, rotor disc 11, and magnet cover 22 are affixed together by the adhesive, whereby the rotor 10 is kept in an integrated state, and the magnets are prevented from becoming misaligned. In addition, the adhesive functions as a vibration-damping material.

Figure 5:
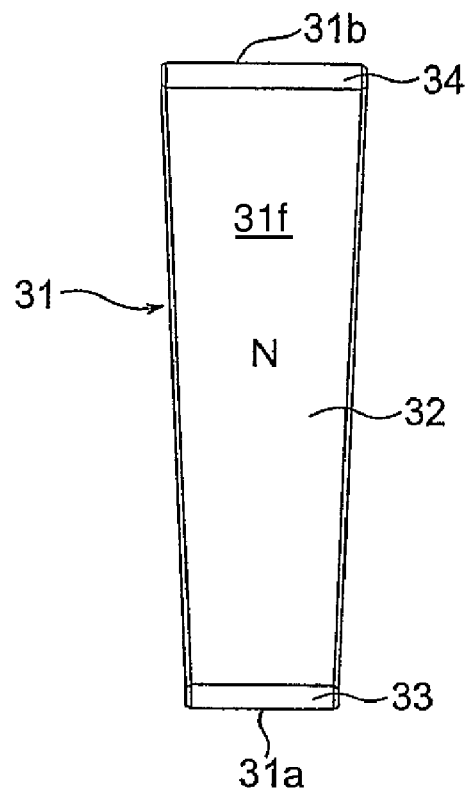
FIG. 5 is a top plan view showing an embodiment of a magnet used in a magnet assembly of the rotor according to the first embodiment.
Figure 6:
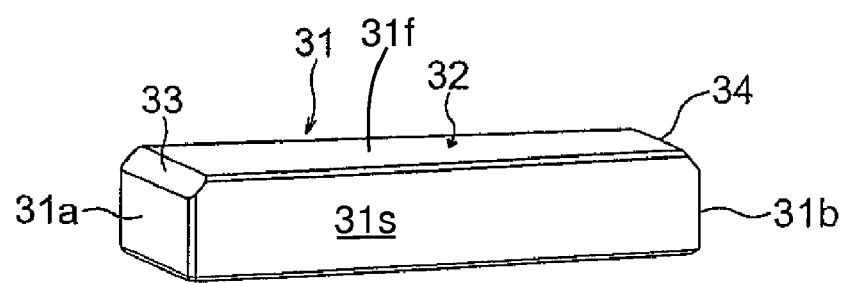
FIG. 6 is a perspective view showing an embodiment of the magnet used in the magnet assembly of the rotor according to the first embodiment.

A single magnet 31 used to form the ring-shaped plate-form magnet assembly 12 shall be described with reference to FIGS. 5 and 6. FIG. 5 shows a plan view of the magnet 31 and FIG. 6 shows a perspective view of the outer appearance of the magnet 31. The four magnets (12A-1, 12A-2, 12B-1, 12B-2) described above and the magnet 31 shown in FIGS. 5 and 6 have the same shapes and sizes (dimensions). In the present embodiment, a rare-earth sintered permanent magnet (e.g., Nd—Fe—B-based) was used for the magnet. However, another type of permanent magnet may be used as long as the magnet has a high magnetic flux.

The magnet 31 has an inner peripheral edge part 31a that is narrow, and an outer peripheral edge part 31b that is wide, as shown in FIG. 5. The shape of a planar part of the magnet 31 corresponds to the shape of part of a wedge-shaped outer side part, as shown in FIG. 5. In other words, the front surface 31f of the magnet 31 (the near side in FIG. 5, the upper side in FIG. 6) has a wedge-shaped planar part 32 having a predetermined tapered angle. An inclined surface part 33 is formed on a side of the wedge-shaped planar part 32 where a corner is formed with the inner peripheral edge part 31a, and an inclined surface part 34 is formed on a side of the wedge-shaped planar part 32 where the outer peripheral edge part 31b forms a corner. In addition, it will be seen from a comparison of FIGS. 4 and 6 that the side surface 31s of the magnet 31 is substantially perpendicular to the front surface 31f thereof.

The magnet 31, whose magnetization direction is set by a sintering process, is subjected to a well-known magnetization process and endowed with polarity, whereby the above-described first and second main magnets (12A-1, 12A-2) and first and second submagnets (12B-1, 12B-2) are formed in accordance with the magnetization direction.

Figure 7:
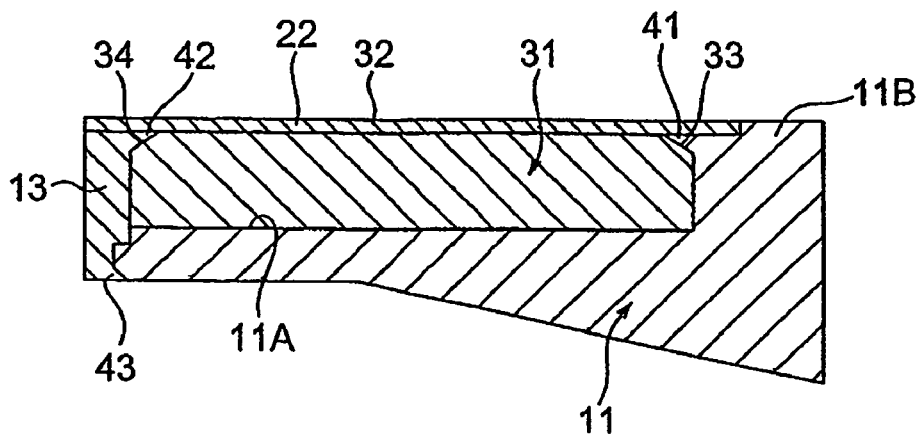
FIG. 7 is a partial cross-sectional view showing the assembly state of the magnet used in the magnet assembly of the rotor according to the first embodiment.

FIG. 7 is a cross-sectional view showing a mounting/fixing structure for the magnet 31 of the rotor 10. The magnet 31 is placed on the receiving part 11A of the rotor disc 11, and the inner peripheral edge part 31a is arranged so as to strike the central part 11B. In this state, the inclined surface part 33 formed on the inner peripheral edge part 31a of the magnet 31 is pressed down by a magnet clamp 41 formed on a circumferential part that is on the outer periphery of the central part 11B. Furthermore, in a state in which the ring-shaped plate-form magnet assembly 12 is mounted onto the rotor disc 11, the outer peripheral ring 13 is mounted to the outer peripheral edge of the magnet assembly 12 and the outer peripheral edge of the rotor disc 11. Once the magnet assembly 12 has been installed in the rotor disc 11, the outer peripheral ring 13 is fixed to the rotor disc 11 by shrink-fitting, as shown in FIG. 7. In this state, the inclined surface part 34 formed on the outer peripheral edge part 31b of the magnet 31 is pressed down by a magnet clamp 42 formed on an inner peripheral part of the front surface of the outer peripheral ring 13. The outer peripheral ring 13 also comprises an inter-locking mechanism 43. The interlocking mechanism 43 is able to prevent the outer peripheral ring 13 from coming off the peripheral edge part of the rotor disc 11.

As described above, in the rotor 10, the sixty-four magnets 31 of the ring-shaped plate-form magnet assembly 12 mounted to the rotor disc 11 are pressed down by the magnet clamps 41, 42, and are thereby fixed to the rotor disc 11.

In the above-described embodiments, the rotor disc 11, outer peripheral ring 13, and magnet cover 22 were fixed in place by using the magnet clamping structures on the outer peripheral ring 13 and rotor disc 11 and by employing shrink-fitting instead of using nuts and bolts. Therefore, the outer peripheral ring 13 can be made thinner due to the fact that a space does not have to be allocated for nuts and bolts. This also contributes to reducing the weight and size of the rotor 10. The rotor disc 11, outer peripheral ring 13, and magnet holder 22 may be fixed by a relationship involving interlocking irregularities having a structure other than that shown in FIG. 7 if an alternative to a bolted configuration is to be provided. For example, a portion of the interlocking mechanism 43 shown in FIG. 7 may have another shape.

In the rotor 10 of the above-described embodiment, the magnet assembly 12 is not positioned in the central part of the rotor 10, but is instead positioned at the outer peripheral part. Therefore, a torque arm will be present, resulting in an increase in the output of a motor using the rotor 10. As described above, the outer peripheral ring 13 is made thinner. The magnet assembly 12 can therefore be placed further toward the outer peripheral part.

In the present embodiment, the ring-shaped plate-form magnet assembly 12 was formed by sixty-four similarly-shaped magnets. However, the number of magnets is not limited thereto. The rotor 10 according to the present invention can be realized as long as there are at least four magnets (two main magnets, two submagnets). In practice, it is desirable to conduct a magnetic simulation to optimally set the number of magnets along with the thickness and width (inner periphery and outer periphery of the wedge-shaped planar form) of the magnets in accordance with the material of the magnets, the diameter of the ring-shaped plate-form magnet assembly 12, the required output of the motor that uses the rotor 10, and other parameters so that copper loss will be minimized in the coil of the stator and so that the rotor 10 will efficiently rotate.

In the present embodiment, the magnets are arranged into a Halbach array structure, whereby the magnetic flux density of the rotor 10 is improved, and a back yoke made from an iron-based magnetic material required in normal magnet rotors composed of only main magnets is rendered unnecessary. As a result, the rotor is made lighter. The rotor for an electric motor according to the present invention can be realized even if a magnet array other than a Halbach array is used. For example, the use of a well-known polar anisotropic magnet will result in magnetic properties that are equivalent to those obtained when a Halbach array is used, and will yield a magnet assembly having a simpler configuration. In addition, the submagnets can be omitted, and a magnet array can be produced that uses only main magnets.

In the above embodiment, the main magnets 12A-1, 12A-2 and submagnets 12B-1, 12B-2 have the same planar shape. However, this is not the only option. The main magnets and submagnets may also have different planar shapes.

Figure 8:
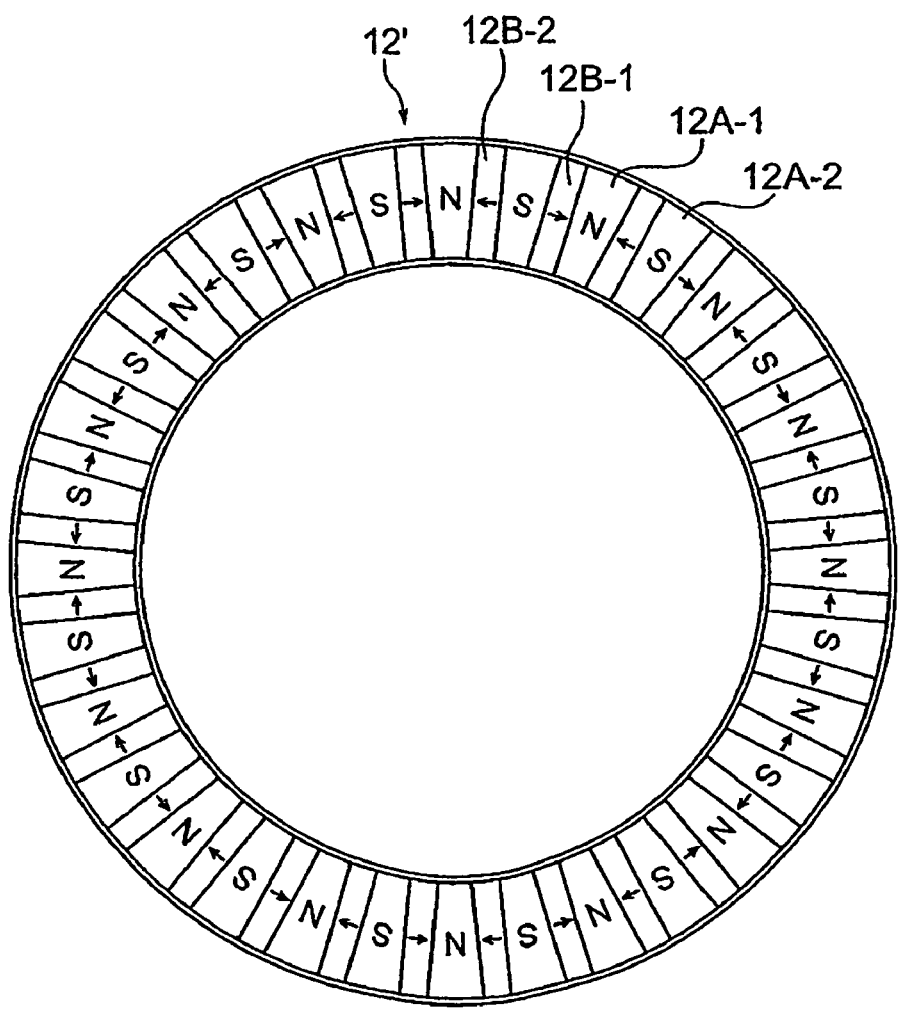
FIG. 8 is a top plan view showing only a magnet assembly of a rotor for an electric motor, according to a second embodiment of the present invention.

FIG. 8 shows a plan view of a magnet assembly 12' of a second embodiment in which the main magnets 12A-1, 12A-2 have a wedge shape similar to that in the above-described embodiment and the submagnets 12B-1, 12B-2 have a substantially rectangular planar shape. As shown in FIG. 8, the main magnets 12A-1, 12A-2 have a greater plane area than the submagnets 12B-1, 12B-2. If the main magnets are thus larger than the submagnets, the magnetic flux density in the direction perpendicular to the sheet will increase over the entire body of the magnet assembly 12'. Therefore, the output of a motor using the magnet assembly 12' will increase further. In addition, a substantially rectangular shape is in general more readily processed than a wedge-shaped planar form. Therefore, the cost of processing the second embodiment will be lower in some instances. It is desirable to conduct a magnetic simulation or the like to optimally set the sizes of the main magnets 12A-1, 12A-2 and submagnets 12B-1, 12B-2 (in particular, relative width in a substantially circumferential direction) in accordance with the magnet material, the number of magnets, the diameter of the ring-shaped plate-form magnet assembly 12, the required output of the motor using the rotor 10, and other parameters so that copper loss in the coil of the stator will be minimized and so that the rotor will efficiently rotate.

The magnet assembly 12 of the first embodiment is less expensive than the magnet assembly 12' of the second embodiment because the main magnets 12A-1, 12A-2 and submagnets 12B-1, 12B-2 have the same planar shape, which allows the same magnet mold to be used and allows the jig forms used to prevent the magnets from becoming misaligned in the manufacturing process to be made the same.

In above-described two embodiments, the inner peripheries and outer peripheries of the magnet assemblies 12, 12' were formed by combining end parts of the main magnets and submagnets that are precisely machined in advance to a curve. However, the inner peripheries and outer peripheries may also be polished to create a more precise peripheral edge part after the ring-shaped plate-form magnet assembly 12 has been formed. In the above-described first and second embodiments, at least one group of magnets selected from the main magnets and the submagnets has a wedge-shaped planar part. However, it shall be apparent that the functions and effects of the present invention can be obtained even if a magnet assembly is used in which at least one group of magnets selected from the main magnets and the submagnets has a trapezoidal shaped planar part.

The configuration, shapes, sizes, and positional relationships described in the above embodiments are merely given in summary to provide an understanding of the present invention. In addition, numerical values and the composition (materials) of the configurations are merely given as examples. Therefore, the present invention is not limited to the described embodiments, and can be modified in a variety of embodiments as long as the embodiments do not depart from the scope of the technical ideas disclosed in the claims.

INDUSTRIAL APPLICABILITY

The inventive arrangement thus far explained can be advantageously used in rotors for wind-power generation motors, elevator motors, wheel motors, and other motors that must be thin and light in weight and that must exhibit strong rotational force.

The invention claimed is:

1. A rotor for an electric motor, said rotor comprising:
a magnet assembly formed into a ring-shaped plate form;
an inner periphery holder for holding an inner periphery of the magnet assembly; and
a ring-shaped outer periphery holder for holding an outer periphery of the magnet assembly,
wherein:
the magnet assembly comprises: first and second main magnets having magnetization directions that face a first direction and having orientations that are opposite one another; and first and second submagnets having magnetization directions that face a second direction perpendicular to the first direction and having orientations that are opposite one another,
the first and second main magnets each have a wedge-shaped planar part, and the first and second submagnets have a substantially rectangular shape; and
the planar parts of the first and second main magnets and first and second submagnets form the same plane of rotation and are arrayed such that the magnetization directions of adjacent magnets are perpendicular to one another.

2. The rotor of claim 1, wherein the first direction corresponds to a direction of an axis of rotation of the rotor, and the second direction corresponds to a direction of rotation of the rotor.

3. The rotor of claim 1, wherein the inner periphery holder is a rotor disc having a receiving part for accommodating the magnet assembly, and a central part for fixing in place an inner peripheral edge part of the magnet assembly.

4. The rotor of claim 3, wherein an inclined surface part is formed on the inner peripheral edge part of each of the main magnets and submagnets constituting the magnet assembly, and a magnet clamp for holding down the inclined surfaces is formed on a circumferential part of the central part of the rotor disc.

5. The rotor of claim 3, wherein the ring-shaped outer periphery holder, rotor disc, and magnet assembly are integrated with one another in a boltless state by a relationship of interlocking irregularities.

6. The rotor of claim 1, wherein an inclined surface part is formed on an outer peripheral edge part of each of the main magnets and submagnets constituting the magnet assembly, and a magnet clamp for holding down the inclined surfaces is formed on an inner peripheral part of the ring-shaped outer periphery holder.

7. A rotor for an electric motor, said rotor comprising:
a magnet assembly formed into a ring-shaped plate form;
an inner periphery holder for holding an inner periphery of the magnet assembly; and
a ring-shaped outer periphery holder for holding an outer periphery of the magnet assembly,
wherein:
the magnet assembly comprises: first and second main magnets having magnetization directions that face a first direction and having orientations that are opposite one another; and first and second submagnets having magnetization directions that face a second direction perpendicular to the first direction and having orientations that are opposite one another,
at least one group of magnets selected from the main magnets and the submagnets has a wedge-shaped planar part,
the planar parts of the first and second main magnets and first and second submagnets form the same plane of rotation and are arrayed such that the magnetization directions of adjacent magnets are perpendicular to one another,
the inner periphery holder comprises a rotor disc having a receiving part for accommodating the magnet assembly, and a central part for fixing in place an inner peripheral edge of the magnet assembly, and
the ring-shaped outer periphery holder, rotor disc, and magnet assembly are integrated with one another in a boltless state by a relationship of interlocking irregularities.

8. The rotor of claim 7, wherein the first direction corresponds to a direction of an axis of rotation of the rotor, and the second direction corresponds to a direction of rotation of the rotor.

9. The rotor of claim 7, wherein an inclined surface part is formed on the inner peripheral edge part of each of the main magnets and submagnets constituting the magnet assembly, and a magnet clamp for holding down the inclined surfaces is formed on a circumferential part of the central part of the rotor disc.

10. The rotor of claim 7, wherein an inclined surface part is formed on an outer peripheral edge part of each of the main magnets and submagnets constituting the magnet assembly, and a magnet clamp for holding down the inclined surfaces is formed on an inner peripheral part of the ring-shaped outer periphery holder.

11. A rotor for an electric motor, said rotor comprising:
a magnet assembly formed into a ring-shaped plate form;
an inner periphery holder for holding an inner periphery of the magnet assembly; and
a ring-shaped outer periphery holder for holding an outer periphery of the magnet assembly;
wherein the magnet assembly comprises: first and second main magnets having magnetization directions that face a first direction and having orientations that are opposite one another; and first and second submagnets having magnetization directions that face a second direction perpendicular to the first direction and having orientations that are opposite one another, wherein each of the first and second main magnets and each of the first and second submagnets of the magnet assembly are respectively formed in a shape including a wedge-shaped planar part, and each of the first and second main magnets and the first and second submagnets of the magnet assembly has substantially the same shape, wherein the planar parts of the first and second main magnets and first and second submagnets form the same plane of rotation and are arrayed such that the magnetization directions of adjacent magnets are perpendicular to one another, and wherein an inclined surface part is formed on an outer peripheral edge part of each of the main magnets and submagnets constituting the magnet assembly, and a magnet clamp for holding down the inclined surfaces is formed on an inner peripheral part of the ring-shaped outer periphery holder.

12. The rotor of claim 11, wherein the first direction corresponds to a direction of an axis of rotation of the rotor, and the second direction corresponds to a direction of rotation of the rotor.

13. The rotor of claim 11, wherein the inner periphery holder is a rotor disc having a receiving part for accommodating the magnet assembly, and a central part for fixing in place an inner peripheral edge part of the magnet assembly.

14. The rotor of claim 13, wherein an inclined surface part is formed on the inner peripheral edge part of each of the main magnets and submagnets constituting the magnet assembly, and another magnet clamp for holding down the inclined surfaces formed on the inner peripheral edge part of each of the main magnets is formed on a circumferential part of the central part of the rotor disc.

15. The rotor of claim 13, wherein the ring-shaped outer periphery holder, the rotor disc, and the magnet assembly are integrated with one another in a boltless state by a relationship of interlocking irregularities.

16. A rotor for an electric motor, said rotor comprising:
a magnet assembly formed into a ring-shaped plate form;
an inner periphery holder for holding an inner periphery of the magnet assembly; and
a ring-shaped outer periphery holder for holding an outer periphery of the magnet assembly;
wherein the magnet assembly comprises: first and second main magnets having magnetization directions that face a first direction and having orientations that are opposite one another; and first and second submagnets having magnetization directions that face a second direction perpendicular to the first direction and having orientations that are opposite one another, wherein at least one group of magnets selected from the main magnets and the submagnets has a wedge-shaped planar part, wherein the planar parts of the first and second main magnets and first and second submagnets form the same plane of rotation and are arrayed such that the magnetization directions of adjacent magnets are perpendicular to one another, and wherein an engaging part is formed on an outer peripheral edge of each of the main magnets and submagnets constituting the magnet assembly, and a magnet clamp, for matingly receiving said engaging parts and for holding down the outer peripheral edges of the main magnets and the submagnets, is formed on an inner peripheral part of the ring-shaped outer periphery holder, said magnet clamp comprising an inwardly extending flange having a shape corresponding to the engaging parts of the main magnets and submagnets.

17. The rotor of claim 16, wherein the inner periphery holder is a rotor disc having a receiving part for accommodating the magnet assembly, and a central part including an outwardly extending flange for fixing in place an inner peripheral edge part of the magnet assembly.

18. The rotor of claim 17, wherein the ring-shaped outer periphery holder, rotor disc, and magnet assembly are integrated with one another in a boltless state by a relationship of interlocking irregularities.

19. The rotor of claim 16, wherein an inclined surface part is formed on an outer peripheral edge part of each of the main magnets and submagnets constituting the magnet assembly, and a magnet clamp for holding down the inclined surfaces is formed on an inner peripheral part of the ring-shaped outer periphery holder.

* * * * *